United States Patent [19]

Amberny et al.

[11] 4,439,674
[45] Mar. 27, 1984

[54] PREHENSION UNIT AND MANIPULATOR APPARATUS INCLUDING OPTICAL SENSORS

[75] Inventors: Philippe Amberny, Savigny en Septaine; Michel O. de Mendez, Montlhery, both of France

[73] Assignees: Souriau et Cie; Societe D'Etudes et Applications Techniques S E A T, both of France

[21] Appl. No.: 280,779

[22] Filed: Jul. 6, 1981

[30] Foreign Application Priority Data

Jul. 4, 1980 [FR] France ............... 80 15009

[51] Int. Cl.³ ............... A61F 1/06; G02B 5/14
[52] U.S. Cl. ............... 250/227; 3/12.7; 414/5
[58] Field of Search ............... 250/227, 229; 340/365 P; 33/169 R, 169 F, 172 E, 174 L, 126.7 A; 414/5; 3/12.7

[56] References Cited

U.S. PATENT DOCUMENTS 3,921,445 11/1975 Hill et al. ............... 414/5 X
3,937,952 2/1976 Ripley et al. ............... 340/365 P X
3,952,880 4/1976 Hill et al. ............... 414/5

FOREIGN PATENT DOCUMENTS 2365408 4/1978 France .

OTHER PUBLICATIONS

Bejczy, "Effect of Hand-Based Sensors on Manipulator Control Performance", Mechanism and Machine Theory, 1977, vol. 12, #5, pp. 547-567, Pergamon Press.

Primary Examiner—David C. Nelms
Assistant Examiner—Edward P. Westin
Attorney, Agent, or Firm—Larson and Taylor

[57] ABSTRACT

A prehension unit suitable for use as a finger in a manipulator hand has a supporting body, a contact element carried by the supporting body through a resilient material and defining with the body a closed space. Optical sensors cooperate with a locally light reflecting surface of the contact element. Each sensor comprises an optical fiber for transmitting light from a remote transducer to an end portion terminating in the supporting body in front of the contact element surface and an optical fiber for collecting the light reflected by the surface and conveying it to a remote light sensitive transducer. The movements of the locally reflecting surface, due to axial, radial and/or angular movements of the contact element which results in a change of the amount of reflected light collected by the second fiber may be detected. The manipulator apparatus may be provided with motors for restoring the unit to a position for which no force is exerted by an object to be seized on the contact element.

9 Claims, 10 Drawing Figures

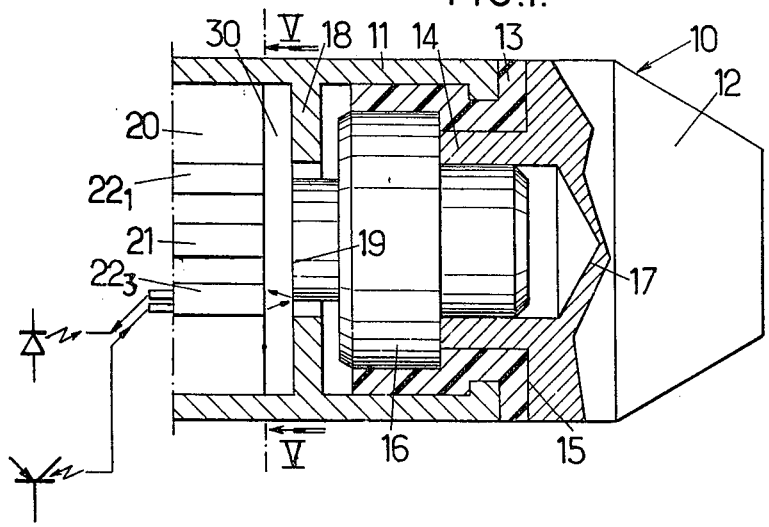
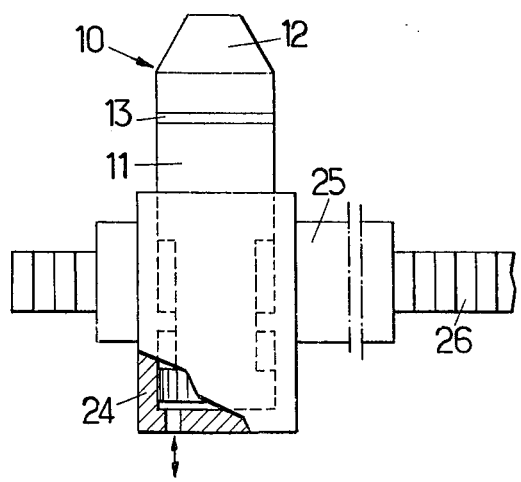
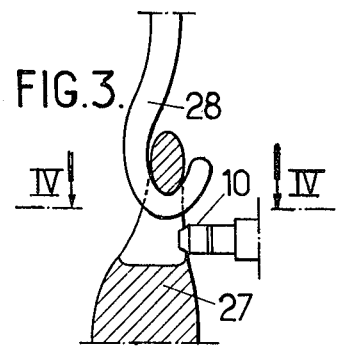
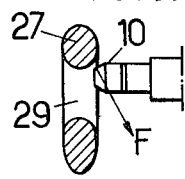
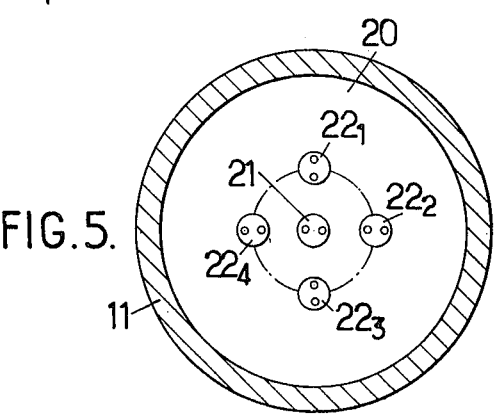

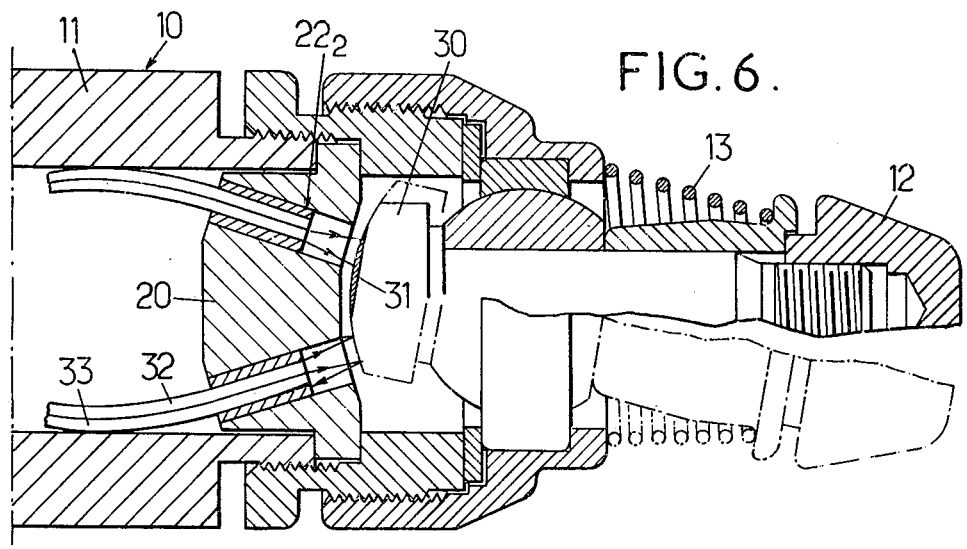
FIG. 6.
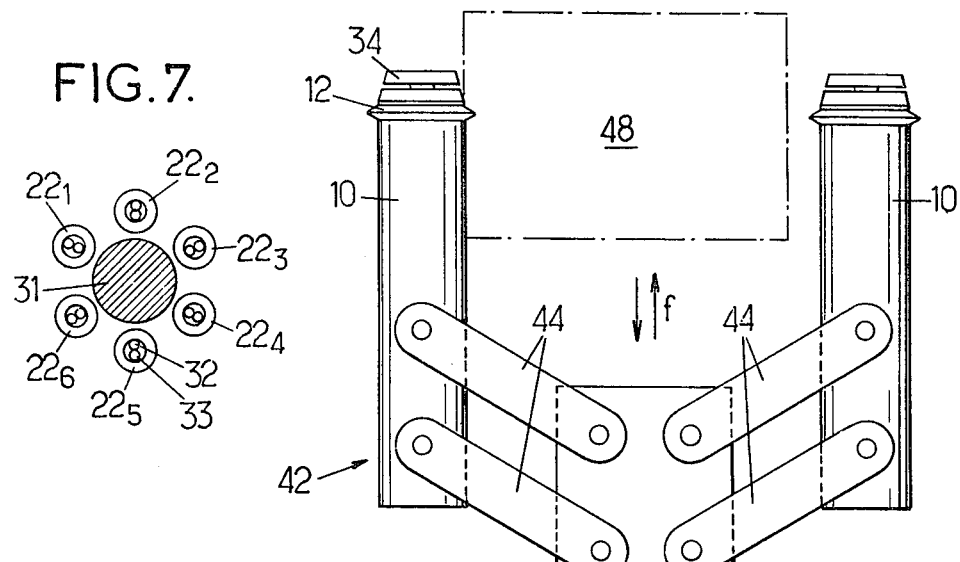
FIG. 7.
FIG. 10.
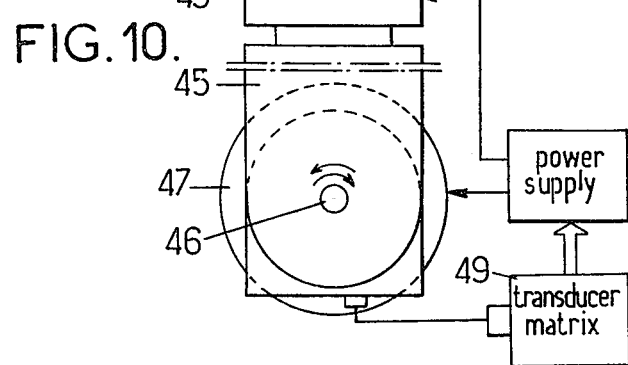

PREHENSION UNIT AND MANIPULATOR APPARATUS INCLUDING OPTICAL SENSORS

BACKGROUND AND SUMMARY OF THE INVENTION

The present invention relates to prehension units provided with optical sensors for detecting objects to be seized, as well as position controlled manipulator apparatuses including such units. The invention is particularly suitable for use in robotics, remote control and construction of motorized prothesis.

Prehension by mechanical units requires detection of the objects to be seized or gripped when the unit is closed to the object. An information almost equivalent to tactile sensation is necessary and makes it necessary to sense torques and/or forces applied to the unit. Since such units are often times used in hostile environment, the design should also be such as to avoid the detrimental effects of high temperatures, vibrations, stresses and contamination on the sensors.

Numerous attempts have been made to overcome that problem. A manipulator including means for sensing torques about three orthogonal axis and forces along said axes is shown, for example, in U.S. Pat. No. 3,952,880 (Hill et al). It includes a plurality of sensing units each having a light source, such as a LED, and a light responsive element, such as a photocell or phototransistor. The amount of light received by the light responsive element changes when there is relative movement between two components of the manipulator coupled by resilient means, caused by a force or torque to be detected.

In that arrangement, the sensors are protected against outside contamination. On the other hand, such a construction has a number of shortcomings. The light emitting and light sensitive components are located close to the object to be gripped in the manipulator. In a number of situations, they are consequently subjected to hostile conditions, such as high temperatures and vibrations. It is well known that such electronic components are frequently detrimentally affected by such conditions. Since the active sensors are distributed within the manipulator, access thereto for replacement is frequently rather difficult and time consuming.

It is an object of the invention to provide an improved prehension unit having means for sensing torque and/or forces which is particularly adapted for use under the adverse conditions encountered in practice.

It is another object to provide a prehension unit whose transducers are not subjected to the environment in which said unit may be used.

For that purpose, the invention includes a prehension unit having a supporting body, a contact element carried by the supporting body through resilient means and defining with said body a closed space and optical sensor means. Said optical sensor means comprises optical fiber means for transmitting light from a remote transducer to an end portion of said optical fiber means terminating in said supporting body in front of a locally reflecting surface of the contact element transverse to longitudinal axis of said body and optical fiber means for collecting the light reflected by said surface and conveying it to said remote receiving transducer, whereby the movements of said locally reflecting surface which result in a change of the collected amount of light may be detected.

Due to the optical fiber means, the information sensing function is completely separated in space from information processing. The transducers which cooperate in the latter function may be located together at a distance from the unit in a common housing which is not subjected to the environment of the prehension unit.

The body typically has several sensors cooperating with the contact element for detecting movements along several directions and/or tilting movements. Each sensor preferably has two optical fibers in a common terminal which confronts the locally reflecting surface.

The invention will be better understood from a consideration of the following description of particular embodiments of the invention, given by way of examples only.

SHORT DESCRIPTION OF THE DRAWINGS

FIG. 1 is a simplified representation of the terminal portion of a prehension unit according to a particular embodiment, in cross-section along an axial plane;

FIG. 2 is a schematic illustration of a possible use of the prehension unit of FIG. 1;

FIGS. 3 and 4 are schematic representations of the approach and contact phases when the prehension unit of FIGS. 1 and 2 is used for handling meat quarters, respectively in vertical and horizontal cross-section;

FIG. 5 illustrates a possible arrangement of the sensors in the prehension unit of FIG. 1, as seen in the direction of arrows V/V in FIG. 1;

Figure 8:
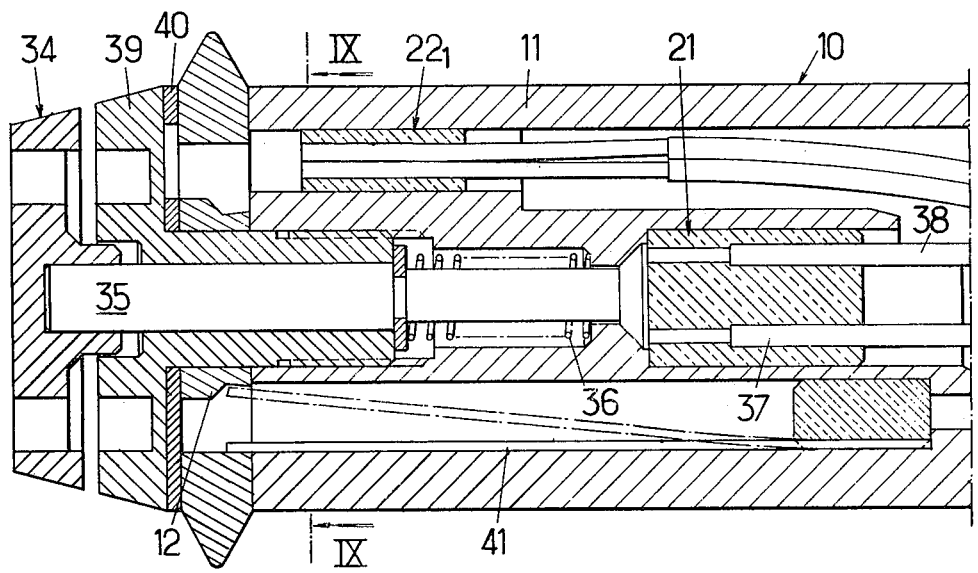
Figure 9:
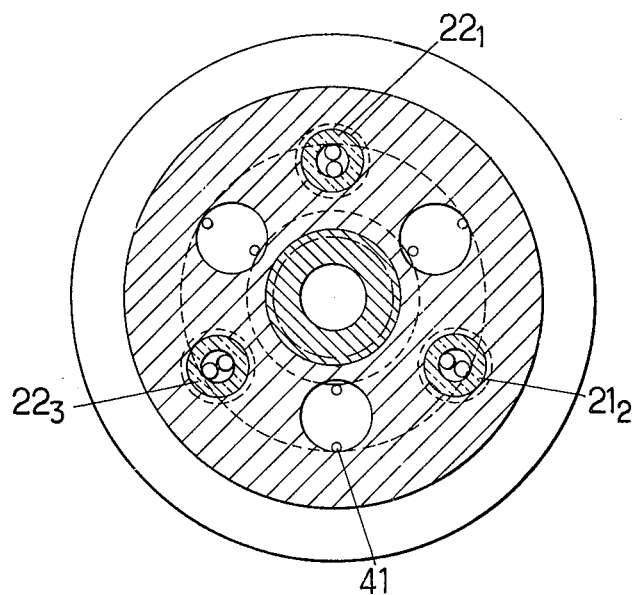

FIG. 6, similar to FIG. 1, illustrates a modified embodiment;

FIG. 7 is a schematic illustration of a possible arrangement of the sensors and the light absorbing area in the device of FIG. 6;

FIG. 8, similar to FIG. 1, is an illustration of still another embodiment;

FIG. 9 is a cross-sectional view along line IX—IX in FIG. 8;

FIG. 10 is a schematic illustration of a possible arrangement of several units according to FIG. 8 for constituting a manipulator.

DETAILED DESCRIPTION OF PARTICULAR EMBODIMENTS

Referring now to FIGS. 1, 2 and 5, there is shown a prehension unit designed to grap, then to carry, suspended loads which may be very heavy. The unit 10, part of which is shown in FIG. 1, comprises a rigid, tubular-shaped body 11 provided for supporting the load, movable by a handling apparatus (not shown). The end part of body 11 carries a contact element 12 through resilient means 13 deformable in the axial and/or transverse direction when a force is applied to element 13. Element 12 is in the form of a feeler having a frusto-conical end portion so as to be more easily inserted in a passage and to cause, in the case of a laterally exertred force, a force transverse to the axis of unit 10. As shown, the resilient means 13 comprises a sleeve of elastomer material placed between the end part of body 11 and an extension 14 of reduced diameter of the feeler projecting into the end part. The middle part of the sleeve is imprisoned between a shoulder 15 and a separate part 16 fixed—for example by bonding or by a threaded connection—in a blind central hole 17 of projection 14. To avoid excessive deformation of the resilient means, a stop is advantageously provided on body 11. In FIG. 1, that stop 18 comprises an internal flange which limits movement of part 16. The extent of the movement allowed by stop 18 will generally be in the mm range.

Body 11 and feeler 12 carry cooperating elements of optical sensors for detecting the relative movements of the body and of the feeler. The number and the location of these sensors will depend on the amount of information to be collected.

In the embodiment illustrated in FIGS. 1 and 5, the elements carried by part 16 consist of a light reflecting surface 19 perpendicular to the axis of the unit. Then the part 16 is low cost, since it is purely passive. Part 16 may then be inexpensively replaced at the same time as the resilient means in the case of damage.

The elements of the optical sensors carried by body 11 are formed by optical fiber pairs whose end faces are level with the end surface of a core 20 contained in body 11. The other end portions of the two optical fibers of each pair are respectively associated with a light source and a light sensitive element which may be at a substantial distance from unit 20.

If the optical sensors are for detecting movements of feeler 12 with respect to body 11 in the transverse direction and providing an indication as to the direction of the movement with respect to the axis, there may be provided a central sensor 21 disposed along the axis and at least three lateral sensors disposed so that the light reflection by the reflecting surface 19 occurs in the same way for the three sensors when feeler 12 is in rest condition. In the embodiment shown in FIGS. 1 and 5, four lateral sensors $22_1$ to $22_4$ are used. This arrangement makes it easier to determine movements in two perpendicular directions, each corresponding to three sensors along a same line (the central sensor 21 and two lateral sensors).

Each sensor, for example sensor $22_3$, is formed from two optical fibers, one for bringing light and the other for returning light. The optical fiber assembly may be associated with a single detecting system, for example of the kind described and claimed in European Patent Publication No. 8267 whose content is included in the present application by way of reference.

When feeler 12 contacts an object upon forward movement of body 11, a force appears which will in general be oblique to the axis and will move feeler 12 transversely and angularly. That movement will modify the response of at least one sensor; if, for example, upward movement takes place in FIG. 1, light will be reflected to a lesser degree from the incoming fiber to the outgoing optical fiber of sensor $22_3$; reflection will even cease as soon as the edge of the reflecting surface has moved by a sufficient amount which may typically be of about 1/10 mm, but which may be selected at another value and will depend on the radius of the circle along which sensors $22_1, \ldots 22_2$ are distributed and the diameter of the reflecting surface 19.

The prehension unit shown in FIG. 1 may be mounted on an apparatus for moving it. For example, FIG. 2 shows a fraction of an apparatus in which unit 10 is carried by a jack 24 for moving it forward and rearward. Jack 24 is mounted on a carriage 25 movable along a rack 26 in a direction transverse to the axis of unit 10 and the rack may be carried by the fork of a fork-lift truck (not shown).

Referring to FIGS. 3 and 4, there will now be described the grasping and handling of meat quarters 27 carried by hooks 28 of a conveyor. Each quarter 27, whose weight will typically exceed the limit of 120 kg imposed by the French law on manual handling, is suspended from a hook 28. The prehension unit 10 shall be inserted in an indentation 29 of the meat quarter, then raised.

The operator then brings his fork-lift truck opposite the quarter of meat, raises the fork so as to bring the prehension unit 10 at the level of the indentation and actuates rack 26 so as to align it approximately with indentation 29. He then actuates jack 24 to advance unit 10. If unit 10 is exactly opposite the indentation, it moves completely therein and no signal is supplied by the optical sensors.

The finger may also be exactly opposite the meat quarter; then, the feeler will be moved rearwardly and all sensors will supply a similar response. The operator will then move member 10 back, then transversely or upwards for a new attempt.

In another situation, which will be the most frequent, unit 10 abuts obliquely against the meat quarter, as shown in FIG. 4 and an oblique force F is caused to appear. The system associated with the sensors may be provided to give no signal as long as the extent of movement is less than a predetermined threshold which corresponds to a force F below which unit 10 may be forcibly inserted into the opening of the meat quarter. If the threshold is exceeded, a signal appears on the control panel of the truck. Since the sensors give an indication in respect of the angular direction of force F, the control panel may provide the operator with an indication of the direction (transverse or in height) in which unit 10 should be moved.

Numerous modified embodiments are possible. Again for handling purposes, there may be provided, instead of a single unit 10 mounted on a rack, several units located close to each other. Then it will be sufficient for the operator to try successively the members which he considers the closest to the opening until one of them is inserted.

Furthermore, the system for processing the signals supplied by the optical sensors may be provided so as to supply quantitative indications concerning the amount of movement of the feeler. This result may for instance be attained by providing an increased number of sensors, distributed over several circles of different radii.

In all cases, the essential advantages of the invention are retained: the optical sensors cannot be polluted since they are placed in an enclosed space 30 (FIG. 1) and the optical fiber sensors, formed by the optical fiber, are used for detecting and transmitting the signals to remote transducers.

Turning now to FIGS. 6 and 7, where the elements corresponding to those in FIGS. 1 and 5 are designated by the same reference numerals, there is shown a modified embodiment of the invention which again includes a body 11 carrying a feeler 12. The feeler has a ball and socket universal connection with the body, which consists of several parts threadedly connected together. Resilient means, consisting of a spring 13, tends to restore the feeler 12 to the rest position in which it is illustrated in full lines in FIG. 6. Pivotal movement of feeler 12 is restricted to a predetermined range by abutment of its rearwardly extending portion 30 against an inner wall of the body. The rearwardly facing surface of extension 30 is spherical. It is light reflecting, except for a central surface 31 which is light absorbing. The optical sensors $22_1$–$22_6$ are distributed at equal angular intervals in a core 20 carried by body 11. No axial sensor is provided in that embodiment. As a counterpart, there are six lateral sensors in place of the four sensors in FIG. 1. Each sensor comprises the terminal portions of a light emitting fiber 32 and a light collecting fiber 33 associated with transducer located at a distance.

Operation of the unit is similar to that of the first embodiment: any pivotal movement of the feeler around the ball and socket connection changes the location of the light absorbing surface with respect to the sensors $22_1$–$22_6$. If for instance the feeler is in the limit position shown in FIG. 6, there is no light reflected back to the collecting fiber of sensor $22_2$. The arrangement of FIGS. 6 and 7 makes it possible to define twelve directions of pivotal movement each corresponding to loss of reflection to one sensor and twelve intermediate positions corresponding to loss of light reflection toward two adjacent sensors.

The embodiment of FIGS. 8 and 9, which will be preferred when several units should be assembled in a same manipulator hand, comprises different sensors for detecting axial abutment and lateral abutment. The embodiment of FIGS. 8 and 9 again comprises a body 10 consisting of several parts assembled together, for instance by a threaded connection. A first contact element 34 for detecting axial abutment comprises a terminal tip, of circular shape, carried by a rod 35 slidably received in body 10. A spiral compression spring 36 biases the contact element toward a projecting position, in which it is illustrated in FIG. 8. When an axial force sufficient to overcome the return force of spring 36 is applied to the contact element 34, that element is moved to a position where it blocks a light path from a light transmitting fiber 37 to the light collecting fiber 38 of an axial sensor 21.

In the embodiment of FIGS. 8 and 9, the lateral contact element consists of a disk 12 retained in contact against the end surface of body 11 by the terminal flange of a threaded sleeve 39 carried by the body. A calibration washer 40 may be inserted between the flange and disk 12. Resilient means, consisting of three lengths of steel wire 41 bias the disk 12 to a rest condition where it is centered with respect to the body. Radial movements of the disk are detected by three sensors $22_1$, $22_2$, $22_3$ similar to the sensors of the first two embodiments.

There is no need to describe the operation of that units, since it is similar to that of FIG. 1.

As already indicated, a plurality of prehension units may be assembled in a common manipulator. Referring now to FIG. 10, there is shown a manipulator hand 42 having a wrist 43 on which two prehension units 10 are mounted through a parallelogram linkage consisting of two links 44. Motor means (not shown) are provided for moving the two units 10 toward and away from each other. The wrist 43 is carried by an arm 45 which may be rotated about an elbow pivot 46 by motor means 47. The assembly comprising the hand and the arm may be moved by motor means (not shown) in the direction indicated by arrows f.

Operation of the apparatus for gripping a load 48, having for instance the shape indicated in dash dot lines in FIG. 10, is as follows: the assembly is first moved forward until the units 10, which constitute the fingers of the manipulator hand, straddle the load. The motor means actuating the linkage 44 is then energized to progressively close the fingers. Generally, the load will not be exactly centered within the hand. Then, the lateral sensing or contact element 12 of one finger 10 will first contact the load. That contact element will be moved away from its rest position and a signal will be delivered by one of its sensors. All optical sensors of the manipulator apparatus may be connected to a common processing unit 49 including a transducer matrix of the type disclosed in European Patent publication No. 8267. Detection of contact by one prehension unit results in actuation of motor 47 in a direction causing loss of contact. The linkage actuating motor may then be energized again and the sequence of operation may be repeated until the hand is closed on the load.

If, during the first approach, one of the units 10 abuts the load axially, the corresponding sensor 21 delivers a signal which may be processed for stopping forward movement and causing a transversal movement of the hand.

Any number of prehension units, typically three or four, may be located on a same hand. Each unit may be associated with a separate motor for stopping the gripping movement of a unit as soon as contact occurs. It should be understood that such modifications, as well as any other variation within the scope of equivalence, is included in the invention.

We claim:

1. A prehension unit having a rigid body; a contact element supported by said body through resiliently deformable means which biases said contact element toward a rest position and cooperating with said body to define a closed space; a plurality of optical sensors carried by said body and cooperating with locally light reflecting surface means on said contact element, wherein said sensors comprise optical fiber means for transmitting light from a remote transducer to an end portion of said optical fiber means terminating in said supporting body in front of a locally reflecting surface of the contact element transverse to a longitudinal axis of said body and optical fiber means for collecting the light reflected by said surface through said space and conveying to a remote receiving transducer, whereby the forces causing movements of said locally reflecting surface in different directions which result in a change of the collected amount of light may be detected.

2. A prehension unit according to claim 1, wherein said plurality of individual optical sensors each cooperate with said contact element for determining the displacements of said contact element in a separate direction.

3. A prehension unit according to claim 2, having at least three said sensors evenly distributed angularly about the axis of said unit and wherein said locally reflecting surface has a circular shape and a diameter which is approximately equal to that on a circle along which said sensors are distributed.

4. A prehension unit according to claim 3, further comprising an additional optical sensor located along the axis of said unit.

5. A prehension unit according to claim 1 or 2, wherein said locally reflecting surface of the contact element is formed on a part connected to a feeler for constituting the contact element therewith.

6. A prehension unit comprising:
a rigid body having a longitudinal axis,
a contact element carried by said body and arranged for slidable movement transverse to said longitudinal axis, cooperating with said rigid body to define a closed space,
resilient means operatively connected to said body and contact element and arranged to bias said contact element toward a rest position, and a plurality of optical sensors carried by said body and distributed about said axis, each said sensor including a pair of light fibers having end portions terminating in said body and opposite end portions respectively cooperating with light emitting transducer means and light responsive transducer means located at a position remote from said body and said contact element including a surface transverse to said axis and having a light reflective area arranged to reflect light received from one of said light fibers through said closed space to the other of said fibers through said closed space only when said contact element is in a predetermined range of positions.

7. A prehension unit according to claim 6, wherein said contact element is in the shape of an annular disk and said unit further includes an additional contact element mounted on said body for slidable movement along said longitudinal axis, resilient means for biasing said additional contact element toward a predetermined protruded position, and an additional optical sensor having a pair of optical fibers for detecting movement of said additional contact element from its protruded position.

8. A manipulator apparatus having a wrist and a plurality of prehension units mounted on said wrist through a motorized linkage arranged for moving said prehension units toward and away from each other, each of said prehension units having a rigid body; a contact element supported by said body through resiliently deformable means and cooperating with said body to define a closed space; optical sensor means carried by said body and cooperating with locally light reflecting surface means on said contact elements, said optical sensor means comprising optical fiber means for transmitting light from a remote transducer to an end portion of said optical fiber means terminating in said supporting body in front of a locally reflecting surface of the contact element transverse to a longitudinal axis of said body and optical fiber means for collecting the light reflected by said surface through said space and conveying the light to a remote receiving transducer, whereby the movements of said locally reflecting surface which result in a change of the collected amount of light may be detected, all optical sensor means associated with said manipulator apparatus cooperating with transducer means located in a common housing remote from said unit.

9. A manipulator apparatus according to claim 8, wherein said transducers cooperate with motor energizing means for controlling movement of the wrist and prehension units.

* * * * *